Patented Sept. 15, 1936

2,054,624

UNITED STATES PATENT OFFICE 2,054,624

CURING SALT MASS

Enoch L. Griffith, Chicago, Ill., assignor to The Griffith Laboratories, Inc., Chicago, Ill., a corporation of Illinois No Drawing. Application September 5, 1935, Serial No. 39,258

10 Claims. (Cl. 99—222)

The present invention relates to curing salt for treating meat and the like, to the process of curing such material, and to methods of making such salt.

Since ancient times sodium chloride has been used as a meat preservative. Long ago it became known that nitrate of sodium or potassium in addition to salt, was beneficial. In particular the mixture reddened the meat and its color and appearance was better. It then became known that nitrate alone was of value individually in improving the color and appearance of meat. Subsequently it was discovered that the effectiveness of nitrate was due to nitrate being changed to nitrite, and it was also learned that the nitrite itself was changed into nitrous acid, which is the effective agent in producing a red color by union with hemoglobin of blood to form what is termed NO-hemoglobin.

It therefore became a practice to use both nitrate and nitrite with or without sodium chloride. For many years these combinations were produced by mixing the ground crystals of the respective salts. Such combinations have two types of disadvantages. The first is in respect to the constancy or uniformity of composition in a mechanical mixture. The second is in respect to the action of the mixture in the dry salt process of curing. These disadvantages are of great importance in commerce in the curing salt, and in the packing industry in curing meats.

The use of nitrates and nitrites in curing meats is regulated by law in most civilized states because of physiological detriment from intentional or accidental use of an excess. The nitrite is the one most particularly objected to, and in some countries its use is prohibited. In the United States, as in other countries, much discredit has been thrown upon mechanical mixtures of any of the suitable salts of chloride, nitrate, and nitrite. However uniformly the separate ingredients may be mixed by mechanical means, the subsequent disturbance of the mixture (as in handling, packing, shipping, etc.) causes a separation or concentration of one or more ingredients. Thus a bulk mass of the mixture remote in time or space from the mixing mill, may exhibit a non-homogeneous composition, one particular disadvantage being that it is possible innocently to use a mixture exceeding the legal limits for nitrate or nitrite. There are many instances where the United States governmental bureaus have complained of this very effect, where the salt mixture is made at one place and is shipped to another. Excess of nitrite has been a particular ground of objection.

The foregoing changes in composition also give the packer trouble, because the curing salt, for example from the top of a barrel, is different from the curing salt at the bottom of a barrel, and the packers' process or product from the respective portions of the barrel may be different, whether he uses the salt in a wet pickle or in a dry pickle.

The second disadvantage lies in the action of the curing salt on the meat. The idividual salt components have different speeds of penetration and different effects on the color and form of the tissues. Sodium chloride is relatively slow in its progress into meat and the like. Nitrate is faster, but nitrite is still very much faster. Where these salts or any two of them, are together as separate crystals on a meat surface, it follows that from each crystal the salt moves at different speeds into the meat. These salts on entering the meat have different effects on the tissues of the meat. Nitrite in particular opens the pores of the meat to permit exudation of the spoilable juices in the meat, and to promote entry of nitrite. This release of meat fluids must not be so fast that it washes away the dry salt on the surface. It is therefore important where nitrite is used to minimize its sole effect with resulting quick penetration and action on the meat. The nitrate alone has a constricting effect on the pores of the meat, and therefore its sole effect is not particularly objected to. By combining the two a control of penetration may be effected, where absence of nitrite alone is maintained.

The present invention aims to overcome or minimize these disadvantages in a practical way.

One object of the invention is to provide a salt mass or curing unit in which there are on the average no individual grains or particles of the mass which are nitrite crystals or particles.

Another object of the invention is to provide a salt mass or curing unit in which, on the average, the grains or particles are each a complex grain containing sodium chloride, and both nitrate and nitrite.

Still another object of the invention is to provide a salt mass in which, on the average the grains or particles are each a complex grain containing sodium chloride, and a fusion mass of a nitrite and a nitrate.

A further object of the invention is the provision of a salt mass in which the average particle is a grain of sodium chloride within which is housed the nitrate and the nitrite as a fusion mass.

Still another object of the invention is the provision of processes for making salt grains of the character above specified.

Still another object of the invention is the provision of a process for producing the desired salt unit by quickly evaporating water from a solution of the desired salt ingredients.

Various other and ancillary objects and advantages of the invention will be apparent from the following description and explanation of the various phases of the invention.

In carrying out the dry salt process of curing meats it is the aim to avoid the action generally or locally of nitrite undiluted with nitrate. To accomplish this it is of course necessary to employ grains or particles which contain both soluble nitrite and soluble nitrate. It is immaterial to the action of the nitrate or nitrite, what metal is employed in the nitrate and nitrite salt, but it is most common to use sodium or potassium. It is therefore not intended herein to limit the invention to sodium and potassium.

Such grains containing both nitrate and nitrite may be made in various ways and herein I have used a method which is described in detail in my copending applications Serial No. 671,644, filed May 18, 1933; Serial No. 723,226, filed April 30, 1934; and Serial No. 750,708, filed October 30, 1934, of which applications the present application is a continuation in part.

The process is one in which there is used a water solution containing sodium chloride, the nitrate and the nitrite, with or without certain other substances. The solid contents of the solution are then fixed by converting the solution into a thin layer, spray or film, while hot, under conditions which quickly evaporate the water and fix the solids without separation by fractional crystallization.

Where the product results from quick evporation, the product is a fluffy powder which easily dissolves. Its softness, fine grain and quick solubility make it more satisfactory as a curing salt. Where there is about 80% or more of sodium chloride in the solids of the aqueous solution, the product of evaporation exhibits the advantageous effect that a jacket of sodium chloride houses the mixed nitrate and nitrite. Such a salt form provides the assurance that in curing meat with it, the nitrite and nitrate never contact the meat without the presence of sodium chloride.

One effect of strong nitrite on the meat is known as burning, and one effect of strong nitrate is a bitterness in the meat. Where nitrite and nitrate are used together in the forms of this invention the bitterness from nitrate is not found, and the burning of nitrite is avoided. The cure combines the speed features of nitrite and the slow features of nitrate, without the disadvantages of each.

The presence of sodium chloride in the curing unit containing nitrite and nitrate is highly beneficial in limiting the concentration of nitrite and nitrate. It is a diluent which is effective immediately upon contact of nitrite and nitrate with the meat. The greater the content of sodium chloride, the more effective is the diluent.

*The evaporation process*

The details of this process are more particularly described and claimed in my copending application Serial No. 723,226, filed April 30, 1934, which is a continuation in part of my application Serial No. 671,644, filed May 18, 1933, and which is a development under the Seifert Patent No. 1,950,459, issued March 13, 1934. The process here described is substantially the same as described in my application Serial No. 750,708, filed October 30, 1934, from which subject matter here claimed is divided. Some improvements in the process are here described, particularly the use of a buffer or other agent to give a slight alkalinity to the solution for creating a more stable product.

A strong solution containing sodium chloride, sodium or potassium nitrate, and sodium or potassium nitrite, is splashed or otherwise spread into a thin film on a heated revolving roll at a high temperature, such as 140° C. to 160° C. This quickly evaporates the water leaving a fine soft powder of apparently non-crystalline form which falls from the roll, or which may be scraped off. Under the microscope the particles are seen to be crystalline with heart-like centers. Under polarized light in a microscope it is manifest that the heart-like centers are the united nitrite and nitrate and the jacket is largely sodium chloride. By X-ray analysis it has been determined that the lattice of the sodium chloride may contain nitrite, nitrate, and potassium.

Experience has shown that when the dissolved salts of the solution contain about 80% or over of sodium chloride, all the 20%, which may include the nitrite and nitrate, is included in a sodium chloride jacket. Where less than 80% of sodium chloride is employed it is increasingly difficult to secure 100% inclusion (meaning that 100% of the original non-sodium chloride SaH components is housed inside of a crystal of sodium chloride jacket). The non-included nitrite-nitrate appears by X-ray analysis to be the same united form as the heart-like centers of units nitrite and nitrate. Using from 70% to 80% sodium chloride experience has shown that the inclusion is about 70% to 80%.

Where 100% inclusion is readily obtainable there is no necessity to add a binding agent, but where it is difficult to obtain 100% inclusion a binding agent may be present in the solution to be dried, such as starch, gum, gelatin and like colloidal matter. This aids in uniting into one particle all the material, especially causing the part which is with difficulty to be included, to be bound to the other material.

The binding material is to be distinguished from a hygroscopic agent disclosed in said prior application Serial No. 723,226. Therein it is described that the crystal jackets of sodium chloride as made are unstable and contain included water which is released on aging of the crystals. The use of a hygroscopic agent in the original solution provides an insulating substance between the ultimate grains, which absorbs the released water and avoids caking of the grains. Where corn sugar is employed it is found that a slight acidity develops in the mass. The slight acidity is effective to release a small amount of nitrous acid, and after a time, this can be detected by its odor. Where acid is likely to be developed as from the use of corn sugar, the product may be made to assume an unvarying ratio between the nitrite and nitrate by employing a corrective agent. One manner of doing this is described in the copending application of Hall Serial No. 83,703, filed June 5, 1936.

The solution of the salt ingredients and the hygroscopic agent either before evaporation or after formation of the product is rendered substantially stable against change in proportion of nitrite and nitrate, or release of nitrous acid, by adding an agent which renders it slightly but distinctly alkaline at a value of over pH of 7. It appears that at a pH value of 6.5 or even of 6.9, acidity is present or develops.

Many buffer salts may be used which will bring the solution to a pH value over 7 without rendering it alkaline to any marked degree. Disodium phosphate is suitable. However, sodium bicarbonate is preferred. Only sufficient is added to assure a pH not under 7. A pH value of 7.7 to 7.9 is preferred. It may however vary from pH 7 to pH 8 or higher, but excess is not necessary. The manner of accomplishing this is described and claimed in the said Hall application Serial No. 83,703, filed June 5, 1936. As an example of the stability so produced, it may be shown that a product without the corrective agent showed a change from 12% nitrite to 11.5% nitrite in 60 days. With the corrective agent added, the nitrite has remained constant for six months and over. It has also been found that the hygroscopic agents are more effective when the corrective agent is added, due no doubt to the resulting lessening of chemical action in the mass.

As an example of a solution which may be evaporated into a salt mass the following is given:

| | Parts |
|---|---|
| Sodium chloride | 88 |
| Sodium nitrite | 10 |
| Sodium nitrate | 2 to 2½ |
| Other material | 2½ |

The "other material" may be omitted, or it may be the hygroscopic agent or binder, or buffer agent as above described.

Another example is:

| | Parts |
|---|---|
| Sodium chloride | 90 |
| Sodium nitrite | 6 |
| Sodium nitrate | 4 |

(1% to 2% of hydroscopic agent may be added)

Still another example is:

| | Parts |
|---|---|
| Sodium chloride | 80 |
| Sodium nitrite | 12 |
| Sodium nitrate | 8 |

(1% to 2% hygroscopic agent may be added)

The last two examples have a ratio of 60% nitrite to 40% nitrate, which ratio has been found very satisfactory for general use in dry salting cures according to the present invention.

In order to show that the process described is capable of effecting a fusion of the nitrite and nitrate into a single entity it can be shown that the fusion to a single entity takes place by evaporating in the same way a solution of nitrite and nitrate having no sodium chloride. The product is a mass or cake rather than a powder. The function of sodium chloride seems to be to create a powder form and at the same time to divide the fusion into small units housed inside the sodium chloride crystals. Because the process is on its face one of evaporation wherein crystallization would be expected, and because the fusion points of nitrite and nitrate, and of mixed nitrite and nitrate are normally much higher than temperatures used in the evaporative process, it is believed important to set forth some of the peculiar properties of nitrite, of nitrate, and of mixed nitrite and nitrate with and without water.

It has been demonstrated that a given mixture of nitrite and nitrate can be repeatedly fused and chilled, say for about six times, with exposure to air while fused, with the result that nitrite decreases and nitrate increases. The salts have reported melting points as follows:

| | °C. |
|---|---|
| Potassium nitrate | 337 |
| Potassium nitrite | 297.5 |
| Sodium nitrate | 308 |
| Sodium nitrite | 271 |

It is of course well known that mixtures of pure substances may melt lower than each pure substance alone, and will melt lower than the highest melting point. Consequently mixtures of nitrite and nitrate of the alkali metals sodium and potassium melt at temperatures lower than the melting point of the nitrate. Accordingly there is little danger of decomposition of the nitrate when making mixtures of nitrite and nitrate, if reducing agents are avoided, and little danger of oxidation of nitrite, if the exposure to air while fused, is not prolonged.

Sodium chloride, however, melts at a very high temperature, near 804° C. It is not practical to make a curing unit containing nitrite and nitrate and a high content of sodium chloride, such as may readily be made by the evaporative process. The heat required to fuse all the ingredients is too high and leads to substantial destruction of the nitrite which changes the original ratio of nitrite to nitrate. This action renders the composition variable and not subject to accurate control. Likewise, the tendency for sodium chloride to crystallize out is great, and a homogeneous product is not assured on quick cooling of the fused melt. However, at lower temperatures where nitrite and nitrate predominate, the fused mass will dissolve a moderate amount of sodium chloride. As much as approximately 5% of the final mass may be sodium chloride, where 60% of the solvent mass is sodium nitrite and 40% of the solvent mass is sodium nitrate, and the temperature is 270° C.

The use of sodium salts of both nitrate and nitrite is not so advantageous as the use of different metal bases for the two salts. Where there are two metal bases in the fusion the melting point is lower, as illustrated by the following examples:

*Case A*

| | |
|---|---|
| Sodium nitrite | 60% |
| Sodium nitrate | 40% |
| Melting point about | 230° C. |

*Case B*

| | Per cent |
|---|---|
| Sodium nitrite | 60 |
| Potassium nitrate | 40 |

Begins to melt at 126° C. and is completely liquid and transparent at 156° C.

*Case C*

| | Per cent |
|---|---|
| Potassium nitrite | 60 |
| Sodium nitrate | 40 |

Begins to fuse at 139° C. and is completely liquid and transparent at 172° C.

It is believed that the difference in temperature from the beginning of liquefaction to the final complete melting is due to a shift of the ions of sodium, potassium, nitrite and nitrate to an equilibrium condition for the prevailing temperature of the mass. It is only a matter of routine experiment to test the entire range of composition of the materials in cases A, B and C to select that composition which has the lowest melting point, where it is desired to be most economical in the use of heat. Any of these compositions may be altered by various proportions of sodium chloride in order to determine the lowest temperature possible and the composition of a mixture of sodium chloride, nitrite and nitrate with the proper choice of sodium, potassium, or even other metals as metal bases for the nitrite and nitrate.

The above description refers to the evaporative process and the fusion process, but these terms do not indicate that they are unrelated processes. The terms are predicated upon the outstanding step of the process. I am fully aware that fusion occurs in the evaporative process with or without the sodium chloride. For example, when a strong or concentrated solution containing only dissolved

| | Per cent |
|---|---|
| Sodium nitrite | 60 |
| Sodium nitrate | 40 | sodium chloride absent or one containing 28% of dissolved

| | Per cent |
|---|---|
| Potassium nitrite | 60 |
| Sodium nitrate | 40 | sodium chloride absent is spread into a thin layer on a heated surface or roll at about 140° C. to 160° C., the mass loses water and is removed therefrom in a fused cake form as distinguished from crystals obtained by evaporating a solution. On the roll it is visibly fused and of syrupy consistency, and where it is scraped off with a knife (which is of course colder) it forms a solid amorphous cake of the combined nitrite and nitrate. One of the remarkable points about the evaporative process is that it permits of a low fusion point for a mixture containing nitrite and nitrate, which is many degrees below the fusion point of mixed dry salts of nitrite and nitrate.

The difference is perhaps explainable by some role performed by the water in the original solution. At the high temperature of the roll or surface, it is perhaps possible that residual water enters as one component in a fusion comprising water, nitrite and nitrate. It is also possible that some transient or permanent combination between two or three of these ingredients has a low melting point or functions to lower the melting point of the whole. It is not to be assumed that the above suggestions commit the applicant to any particular theory. The facts are that fusion has been observed at this unexpected low temperature.

The above described fusion process resulting from evaporating a solution in thin film upon a heated surface, especially in roll form, is not as desirable as that modification of the process which consists in adding sodium chloride to the solution. The caky form of the product without sodium chloride is not commercially comparable as a curing salt to the granular form containing sodium chloride.

When a large amount of sodium chloride is also present in the solution which contains the nitrite and nitrate, the process is effective to prevent the nitrite-nitrate combination forming a cake. Rather, it effects breaking up the nitrite-nitrate combination into tiny particles or globules which are surrounded with a mass of substantially sodium chloride in a crystal form.

It is possible that the fusion mass of nitrite-nitrate is present as a dispersion in a super-saturated solution of sodium chloride, causing the sodium chloride to crystallize about the dispersed bodies as nuclei for crystallization. This theory however is not to be accepted as the statement of facts, because experts on crystallization phenomena have not been able to explain the situation to their own satisfaction.

The product

The product is normally used in curing meat in small proportion to meat, with sodium chloride in larger proportion. The combined nitrite and nitrate are ordinarily used in amounts of about ¼ oz. to 100 lb. of meat. This small amount cannot easily be applied to meat and it is diluted with about 3 lbs. of sodium chloride which also aids in the curing process. By the evaporative process using sodium chloride the active curing agent (nitrite-nitrate) is provided in the form of microscopic units within the tiny sodium chloride grains of the product. A direct fusion product on the other hand must be provided in ground form and must be mixed in the ordinary practice with common salt in the proportion of ¼ oz. of fused product to 3 lbs. of sodium chloride. This product provides a mechanical mixture of two different types or forms of grains, whereas the jacketed product of the evaporative process employing salt, when mixed with sodium chloride, provides a mixture of essentially sodium chloride grains. The preferred practice according to this invention is to provide salt grains which contain in 2 to 4 oz. thereof, about ¼ oz. of nitrite-nitrate combination. This product provides for more readily manipulating the small quantity of nitrite-nitrate in weighing, handling and mixing as compared to the same operations employing the ¼ oz. of fused product when the mass is mixed with the 3 lbs. of salt. In the evaporation process the first dilution with sodium chloride and the fine grain structure are automatically provided in the process, and to produce the same result employing a direct fusion process, the fused product must be ground and then diluted with salt by mechanical mixing, thereby providing an unsafe mechanical mixture which is avoided by the preferred use of the evaporative process employing sodium chloride.

The curing process

In order to give an example of curing meat, for example hams, the following ingredients are set forth for use with six 16 lb. hams (7 kilograms).

| | Grams |
|---|---|
| Sodium chloride | 1688 |
| Sugar | 100 |
| Sodium nitrite | 10 |
| Sodium nitrate | 2 to 2½ |

In order to avoid having nitrite undiluted with nitrate, the nitrite and nitrate are combined into one product by the process of this invention, with some or all of the sodium chloride.

By the evaporative process the formula may be:

| | Grams |
|---|---|
| Sodium chloride | 1600 |
| Sugar | 100 |
| Salt mass | 100 | comprising:

| | Per cent |
|---|---|
| Sodium chloride | 88 |
| Sodium nitrite | 10 |
| Sodium nitrate | 2 |

Another example employing the preferred proportion of 60% nitrite and 40% nitrate is:

| | Grams |
|---|---|
| Sodium chloride | 2080 |
| Sugar (optional) | 125 |
| Potassium or sodium nitrite | 12 |
| Sodium nitrate | 8 |

In accordance with this invention the nitrite and nitrate are combined by the evaporative process, with some or all of the sodium chloride.

By the evaporative process the formula may be:

| | Grams |
|---|---|
| Sodium chloride | 2000 |
| Sugar (optional) | 125 |
| Salt mass | 100 | comprising:

| | Per cent |
|---|---|
| Sodium chloride | 80 |
| Potassium or sodium nitrite | 12 |
| Sodium nitrate | 8 |

In each case where meat is cured by the present invention there is absence of pure nitrite units which do not also contain nitrate units. The nitrite alone works too fast on the meat, dilating the capillaries to disadvantage. The nitrate has a constricting effect on the capillaries. By causing the two to act together a control of penetration is effected. The speed features of nitrite, and the slow features of nitrate are utilized and compromised. The nitrite and the nitrate act differently in coloring the meat. Where these are separate in the composition the coloring effect is not uniform, but where they are used together, uniformity results.

The salt mass is a perfect curing unit, and in its preferred form having a high sodium chloride content, as well as in any form having nitrite, nitrate and sodium chloride, it contains in one unit or grain, all the curing substances. In the preferred form it may be made to contain all the curing substances in the required proportion for direct application to the meat. Use of the product assures a safe fast cure. The meat is sweeter than where nitrite is used undiluted with nitrate. There is no "burning" from direct action of nitrite. The meat does not exhibit the bitterness which is caused by the action of nitrate alone, or nitrate undiluted with nitrite. There is a lasting bloom on the lean of the meats, and a uniform coloration throughout. It gives to the dry curing process the distinctive advantages of the wet curing process, and eliminates the loss of flavor which ordinarily goes into a wet pickle. The salt mass is distinct from nitrate and from nitrite. It is not nitrate, and it is not nitrite, and it is not like a mechanical mixture of nitrate and nitrite. The salt mass in fact is a wet pickle, fixed by the process into a dry solid form. The mass of particles is homogeneous in composition. The product of the evaporative process is light, soft and flaky, not visibly crystalline, and dissolves like snow. It lacks the sizable rocky grains of the ground and mechanically mixed crystalline salts of sodium chloride, nitrite and nitrate, and the rocky form of the fused product.

From the foregoing description and explanation it can readily be appreciated that the invention can be practiced within a wide range of compositions and materials without departing from the spirit and scope of the appended claims.

One method of using the product herein described is claimed in my companion application Serial No. 39,259, filed September 5, 1935.

I claim:

1. The method of combining meat-curing nitrite and meat-curing nitrate of alkali metal which comprises dissolving the two salts and sodium chloride in water, and quickly evaporating a thin body of the solution at a temperature which effects fusion of the nitrite and nitrate into a unitary body and which effects the formation of sodium chloride crystals to break up the fusion mass into a discontinuous mass.

2. A powder mass containing salt particles which have an average composition of not less than 70% sodium chloride and not more than 30% mixed meat-curing nitrate and nitrite, characterized by the fact that at least about 90% of the mass of salt particles are units containing sodium chloride, nitrite and nitrate, nitrite and nitrate being combined by fusion into a single entity as a heart-like center inside a sodium chloride crystal.

3. A powder mass containing minute salt particles which have an average composition of not less than 80% sodium chloride and not more than 20% mixed meat-curing nitrate and nitrite, characterized by the fact that substantially all of the nitrite and nitrate is housed within sodium chloride crystals, nitrite and nitrate being combined by fusion into a single entity as a heart-like center inside a sodium chloride crystal.

4. A powdery salt mass comprising particles which are essentially sodium chloride and which contain as heart-like centers meat-curing nitrite and nitrate combined by fusion into a single entity, each diluting the other.

5. A powdery salt mass comprising particles which are essentially not less than about 80% sodium chloride and which contain as heart-like centers meat-curing nitrite and nitrate combined by fusion into a single entity, each diluting the other.

6. A powdery salt mass comprising particles which are essentially not less than about 80% sodium chloride and which contain as heart-like centers nitrite and nitrate of sodium combined by fusion into a single entity, each diluting the other.

7. A powdery salt mass comprising particles which are essentially sodium chloride and which contain as heart-like centers nitrite and nitrate of sodium combined by fusion into a single entity, each diluting the other.

8. The method of making a meat-curing salt powder which comprises flash-drying a sodium chloride brine containing small quantities of meat-curing nitrite and nitrate, the sodium chloride being present to not less than 70% of the entire salt content, the temperature of the drying being such as to effect the fusion mass of nitrite and nitrate as water is lost in the drying process.

9. The method of making a meat-curing salt powder which comprises flash-drying a sodium chloride brine containing small quantities of meat-curing nitrite and nitrate, the sodium chloride being present to not less than 80% of the entire salt content, the temperature of the drying being such as to effect a fusion mass of nitrite and nitrate as water is lost in the drying process, whereby the fusion mass is substantially all housed inside of salt crystals as heart-like centers therein.

10. A powdery salt mass for use in curing of meats and the like by making a pickling solution thereof or by direct application to the surface of meat, which comprises a mass of sodium chloride crystals substantially all of which contain heart-like centers, which centers include meat-curing nitrite and meat-curing nitrate combined by fusion into a single entity, each diluting the other, said mass being substantially free from nitrite undiluted with nitrate, and substantially free of nitrate undiluted with nitrite.

ENOCH L. GRIFFITH.

Certificate of Correction

Patent No. 2,054,624. September 15, 1936.

ENOCH L. GRIFFITH

It is hereby certified that errors appear in the printed specification of the above numbered patent requiring correction as follows: Page 3, second column, line 5, in the heading to the table, for "° C." read *Degrees centigrade*; page 4, first column, lines 20 to 28, inclusive, strike out the table and insert instead the following:

| | Percent | |
|---|---|---|
| Sodium nitrite | 60 | sodium chloride absent |
| Sodium nitrate | 40 | | or one containing 28% of dissolved

| | Percent | |
|---|---|---|
| Potassium nitrite | 60 | sodium chloride absent; |
| Sodium nitrate | 40 | | line 29, strike out the words "sodium chloride absent"; and second column, lines 53–54, for "kilo-grams" read *kilo-hams*; and that the said Letters Patent should be read with these corrections therein that the same may conform to the record of the case in the Patent Office.

Signed and sealed this 1st day of December, A. D. 1936.

[SEAL]

HENRY VAN ARSDALE,
*Acting Commissioner of Patents*

10. A powdery salt mass for use in curing of meats and the like by making a pickling solution thereof or by direct application to the surface of meat, which comprises a mass of sodium chloride crystals substantially all of which contain heart-like centers, which centers include meat-curing nitrite and meat-curing nitrate combined by fusion into a single entity, each diluting the other, said mass being substantially free from nitrite undiluted with nitrate, and substantially free of nitrate undiluted with nitrite.

ENOCH L. GRIFFITH.

Certificate of Correction

Patent No. 2,054,624.            September 15, 1936.

ENOCH L. GRIFFITH

It is hereby certified that errors appear in the printed specification of the above numbered patent requiring correction as follows: Page 3, second column, line 5, in the heading to the table, for "° C." read *Degrees centigrade*; page 4, first column, lines 20 to 28, inclusive, strike out the table and insert instead the following:

| | Percent | |
|---|---|---|
| Sodium nitrite | 60 | sodium chloride absent |
| Sodium nitrate | 40 | | or one containing 28% of dissolved

| | Percent | |
|---|---|---|
| Potassium nitrite | 60 | sodium chloride absent; |
| Sodium nitrate | 40 | | line 29, strike out the words "sodium chloride absent"; and second column, lines 53–54, for "kilo-grams" read *kilo-hams*; and that the said Letters Patent should be read with these corrections therein that the same may conform to the record of the case in the Patent Office.

Signed and sealed this 1st day of December, A. D. 1936.

[SEAL]

HENRY VAN ARSDALE,
*Acting Commissioner of Patents*

Certificate of Correction

Patent No. 2,054,624.     September 15, 1936.

ENOCH L. GRIFFITH

It is hereby certified that errors appear in the printed specification of the above numbered patent requiring correction as follows: Page 3, second column, line 5, in the heading to the table, for "°C." read *Degrees centigrade*; page 4, first column, lines 20 to 28, inclusive, strike out the table and insert instead the following:

|  | Percent |  |
|---|---|---|
| Sodium nitrite | 60 | sodium chloride absent |
| Sodium nitrate | 40 | | or one containing 28% of dissolved

|  | Percent |  |
|---|---|---|
| Potassium nitrite | 60 | sodium chloride absent; |
| Sodium nitrate | 40 | | line 29, strike out the words "sodium chloride absent"; and second column, lines 53–54, for "kilo-grams" read *kilo-hams*; and that the said Letters Patent should be read with these corrections therein that the same may conform to the record of the case in the Patent Office.

Signed and sealed this 1st day of December, A. D. 1936.

[SEAL]

HENRY VAN ARSDALE,
*Acting Commissioner of Patents.*